United States Patent [19]

Risser

[11] Patent Number: 4,763,915

[45] Date of Patent: Aug. 16, 1988

[54] FOLDABLE IMPLEMENT CARRIER

[75] Inventor: Philip E. Risser, Woodridge, Ill.

[73] Assignee: J. I. Case Company, Racine, Wis.

[21] Appl. No.: 905,551

[22] Filed: Sep. 10, 1986

[51] Int. Cl.$^4$ ............................................. A01B 73/06
[52] U.S. Cl. ................................... 280/413; 172/311;
280/656
[58] Field of Search ............... 172/311, 456, 662, 776;
280/411 R, 411 A, 411 B, 411 C, 412, 413, 638,
639, 656; 56/228, 385

[56] References Cited

U.S. PATENT DOCUMENTS

| | | | |
|---|---|---|---|
| 4,008,833 | 2/1977 | Gandrud et al. | 172/311 X |
| 4,023,623 | 5/1977 | Anderson | 172/456 X |
| 4,042,044 | 8/1977 | Honnold | 172/311 |
| 4,171,022 | 10/1979 | Applequist | 172/311 |
| 4,172,537 | 10/1979 | Gandrud et al. | 172/311 X |
| 4,211,288 | 7/1980 | Applequist | 172/328 |
| 4,214,634 | 7/1980 | Rau | 172/179 |
| 4,299,292 | 11/1981 | Hughes | 172/311 |
| 4,319,643 | 3/1982 | Carter et al. | 172/311 |
| 4,502,546 | 3/1985 | Moos | 172/311 |
| 4,518,046 | 5/1985 | Rettig et al. | 172/311 |
| 4,576,238 | 3/1986 | Spencer | 172/311 |

OTHER PUBLICATIONS

Product Brochure, Solid Stand Folding Drill Catalog, Great Plains Manufacturing, Inc., Assaria, KS 67416, pp. 1-12, Sep. 1984.

Primary Examiner—Richard T. Stouffer
Attorney, Agent, or Firm—Dressler, Goldsmith, Shore, Sutker & Milnamow, Ltd.

[57] ABSTRACT

A foldable implement carrier is provided with a carriage having at least one support wheel and first and second toolbar sections carried by the carriage. First and second mounting mechanisms are provided for pivotally mounting the first and second toolbar sections respectively to the carriage about first and second vertical pivot axes, respectively, for pivoting movement between a generally transversely aligned end-to-end field configuration and a generally parallel transport configuration. The second pivot axis is located further forward on the carriage than the first pivot axis. First and second motors are provided for effecting pivoting movement of the first and second toolbar sections, respectively.

13 Claims, 10 Drawing Sheets

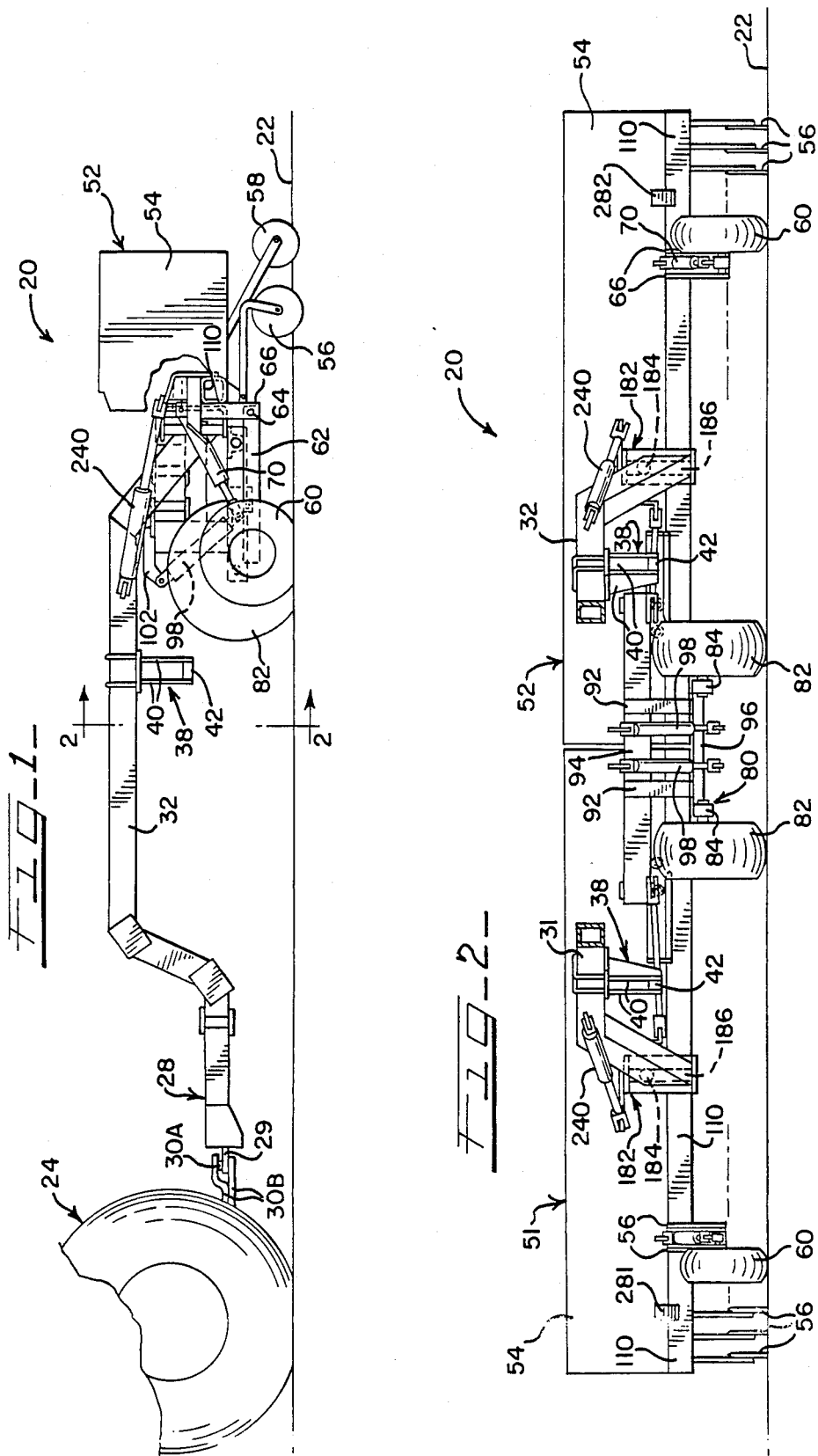

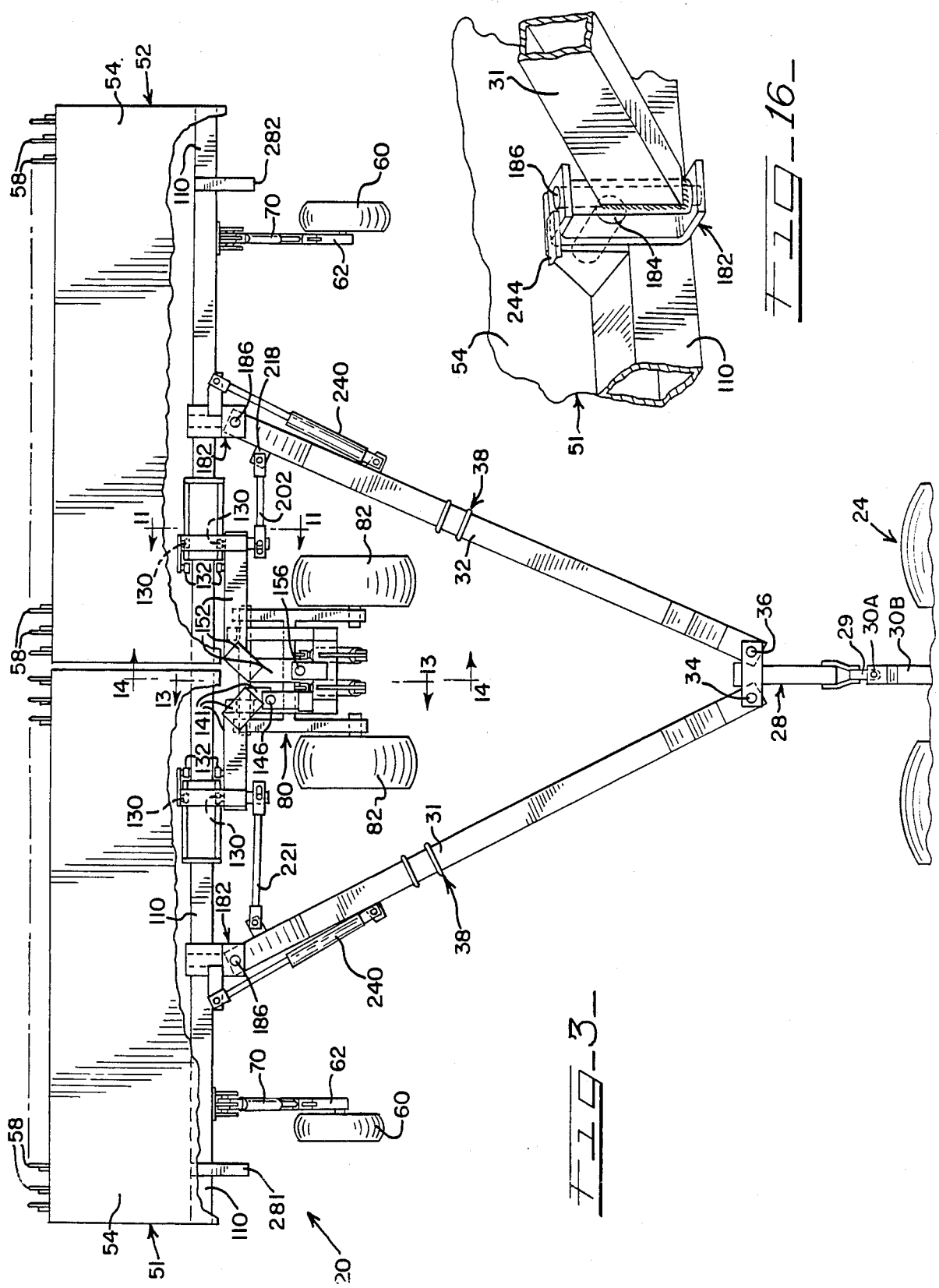

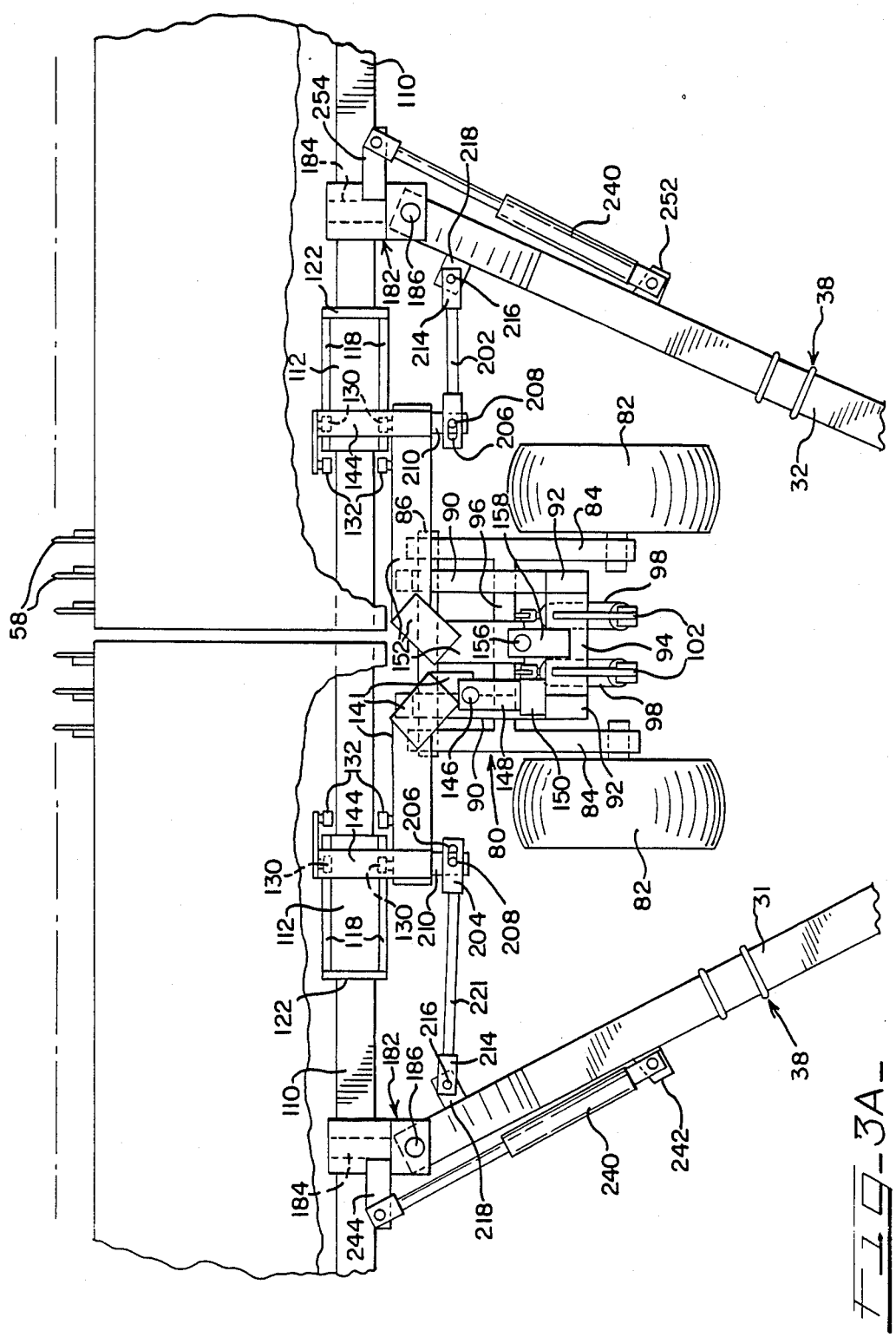

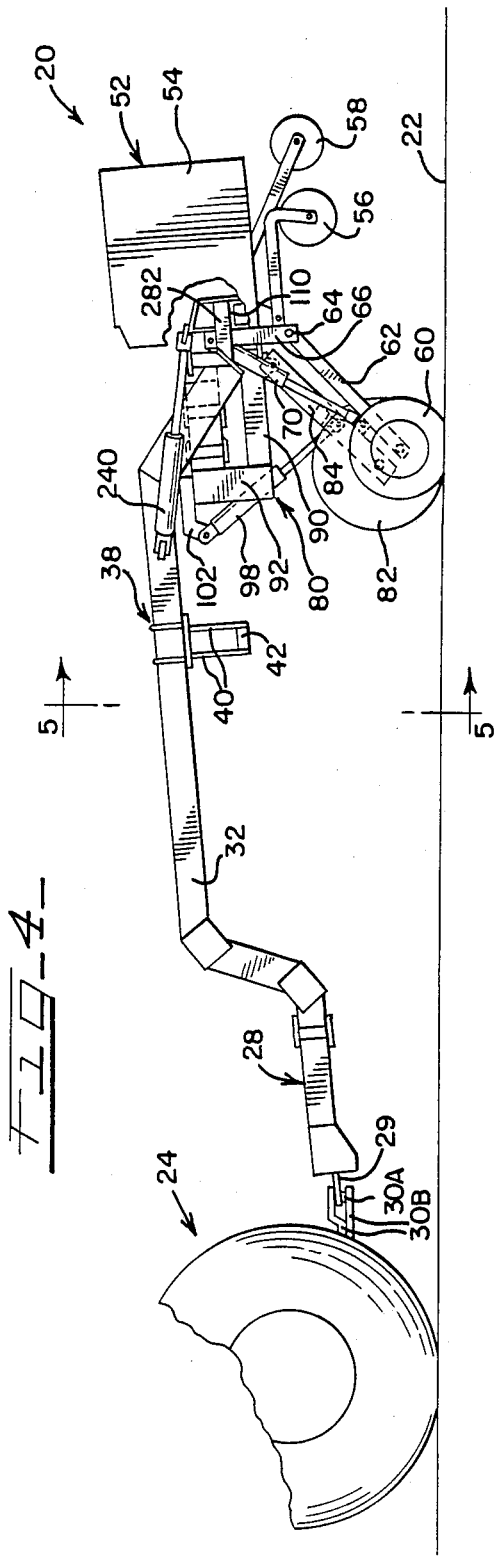
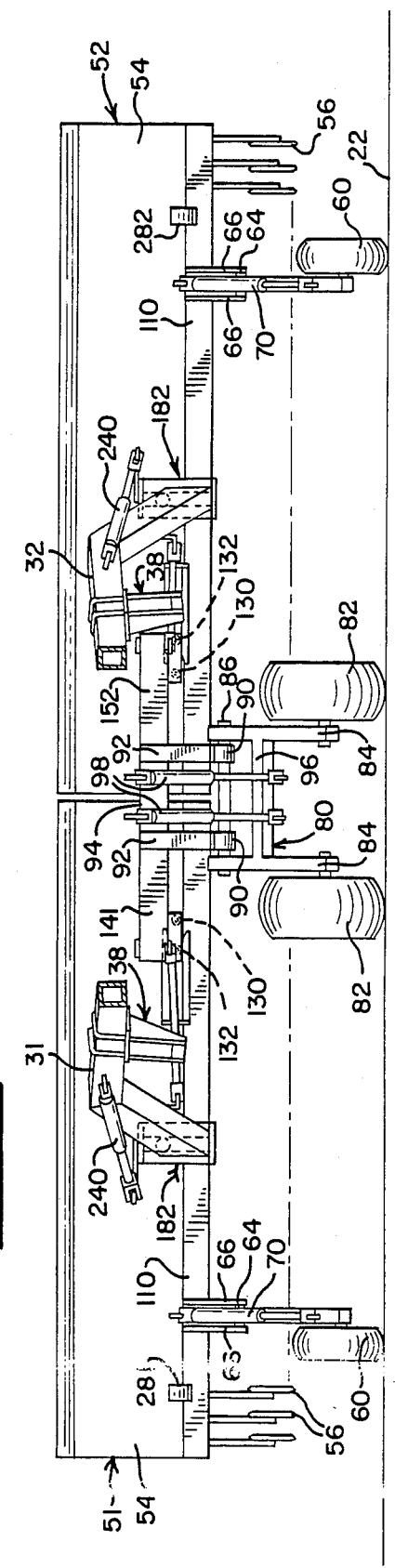

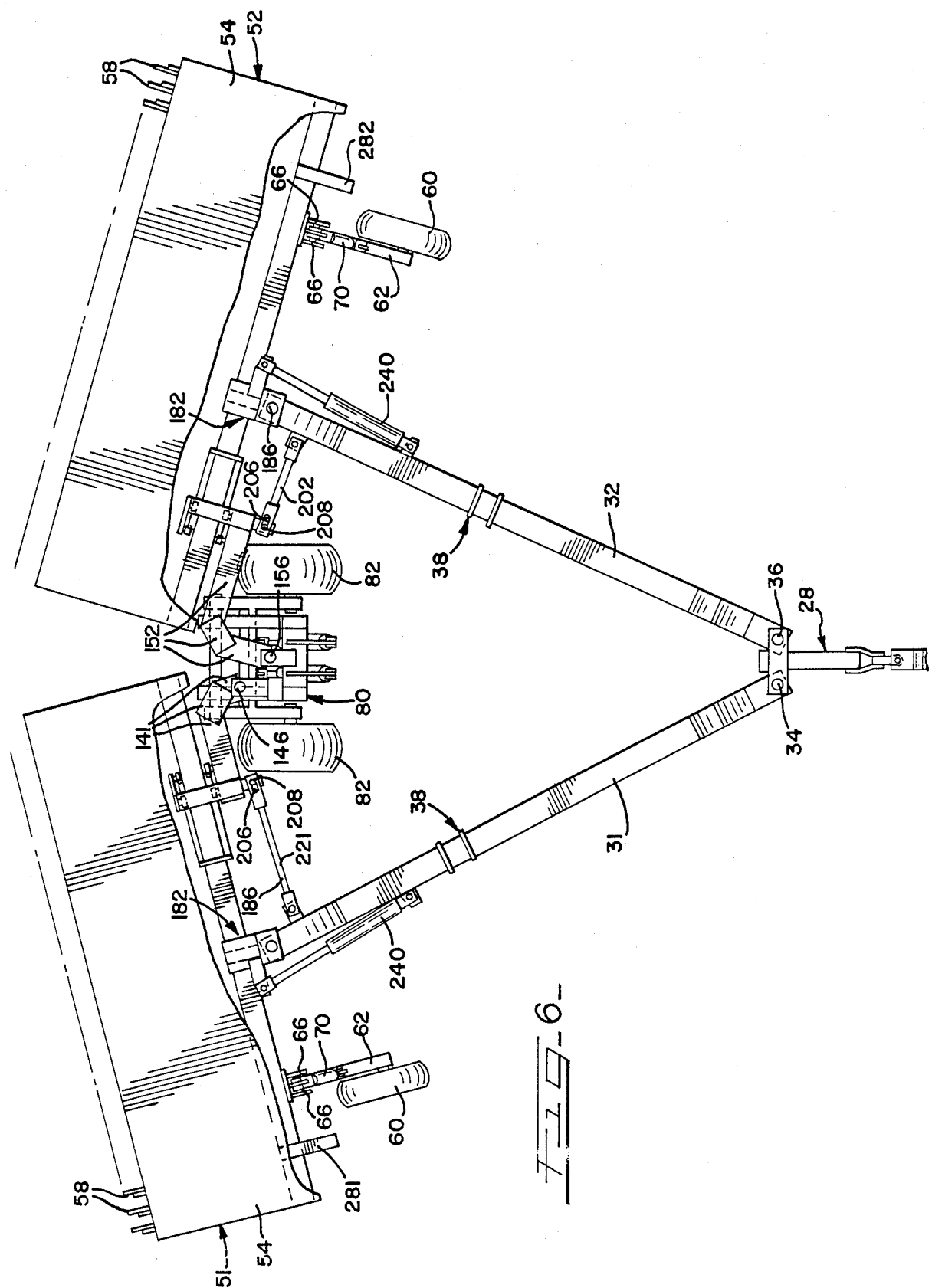

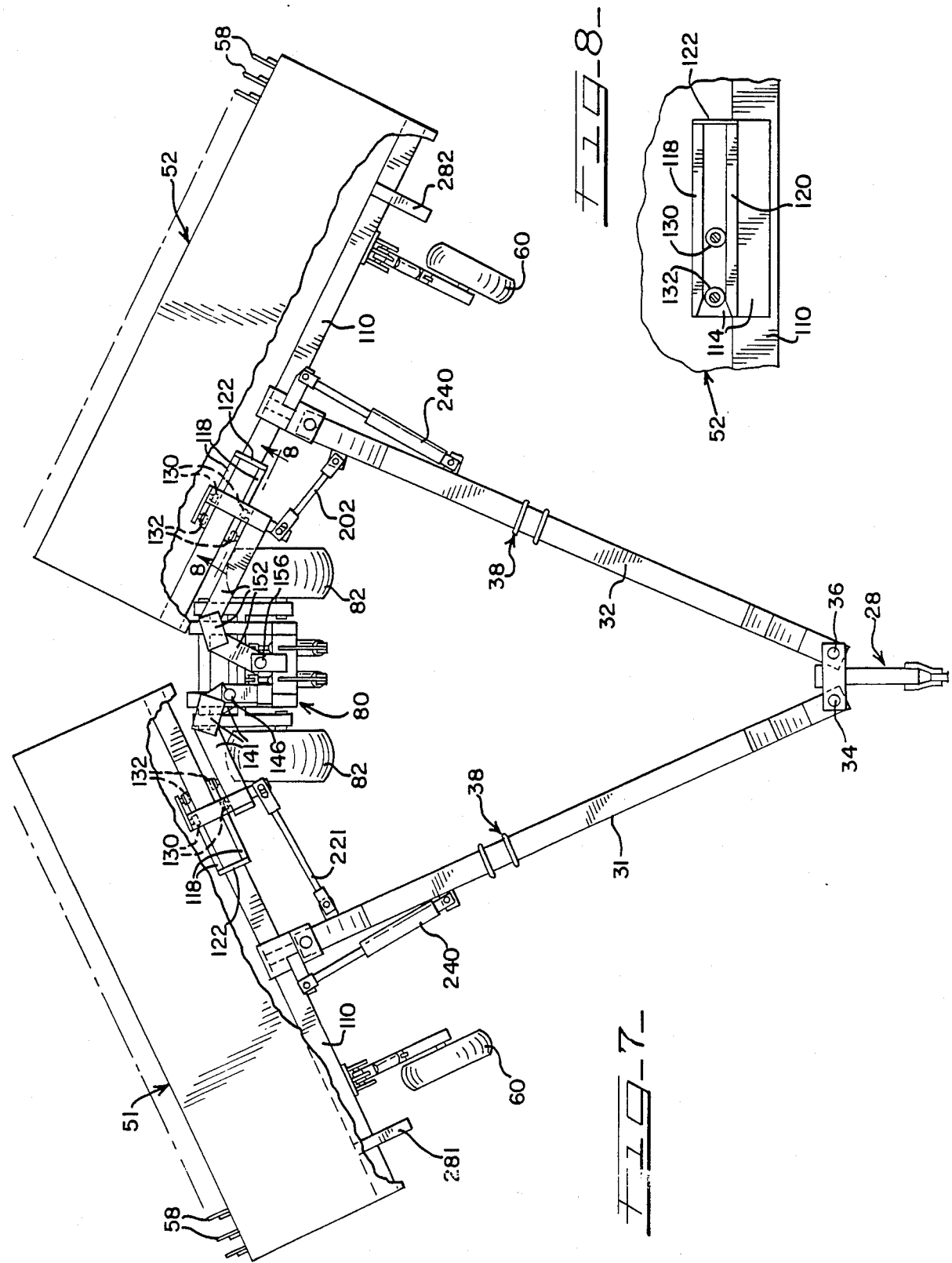

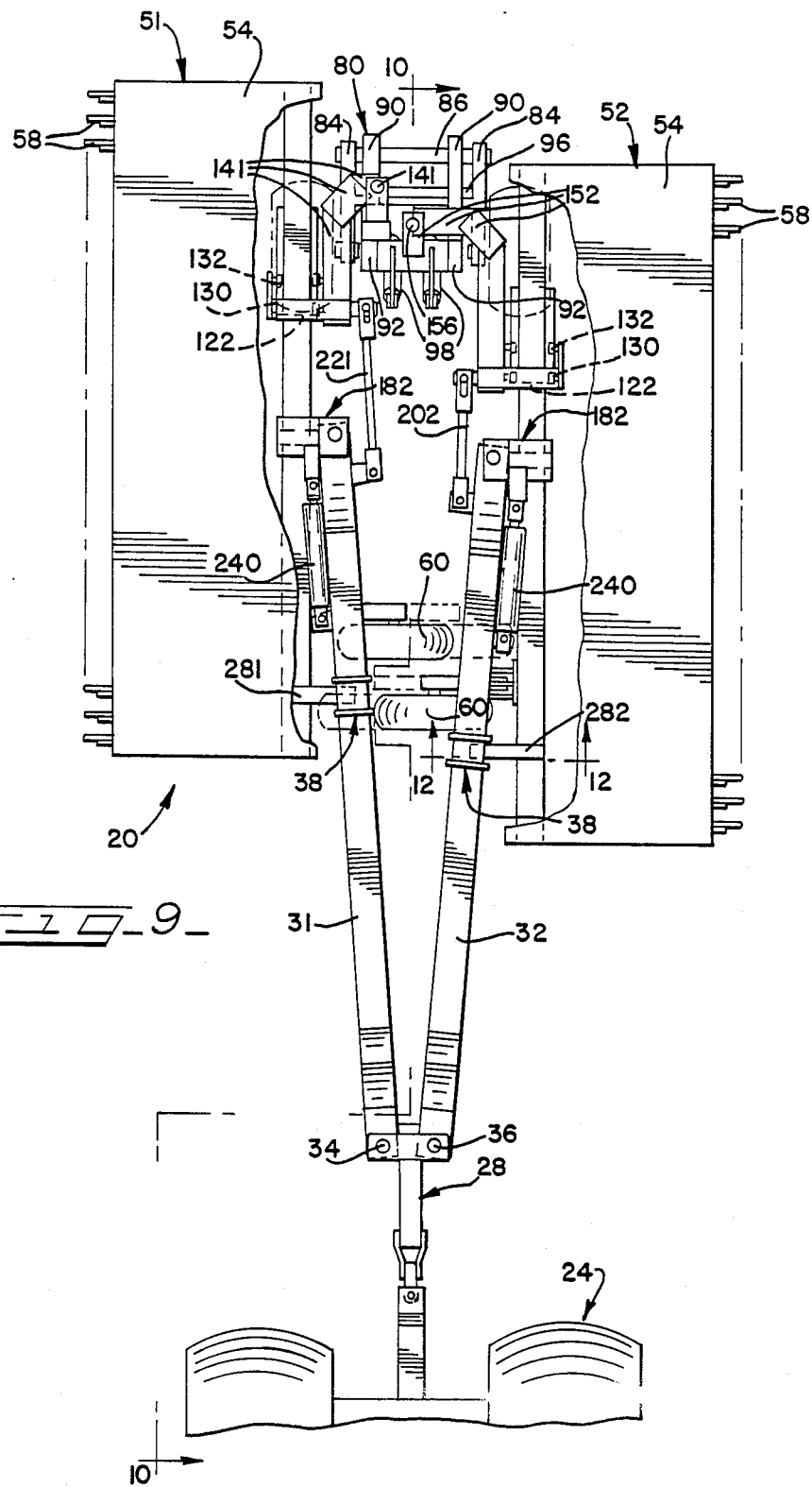
FIG_9

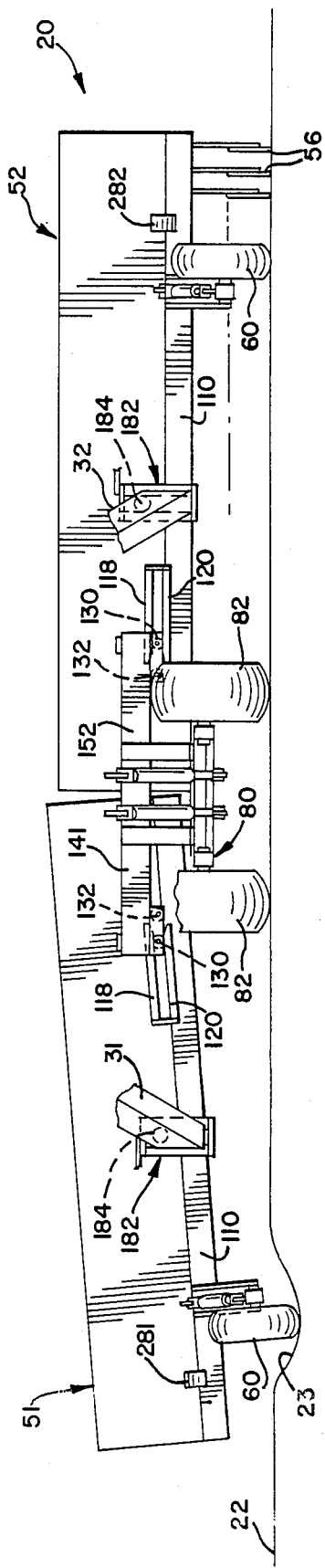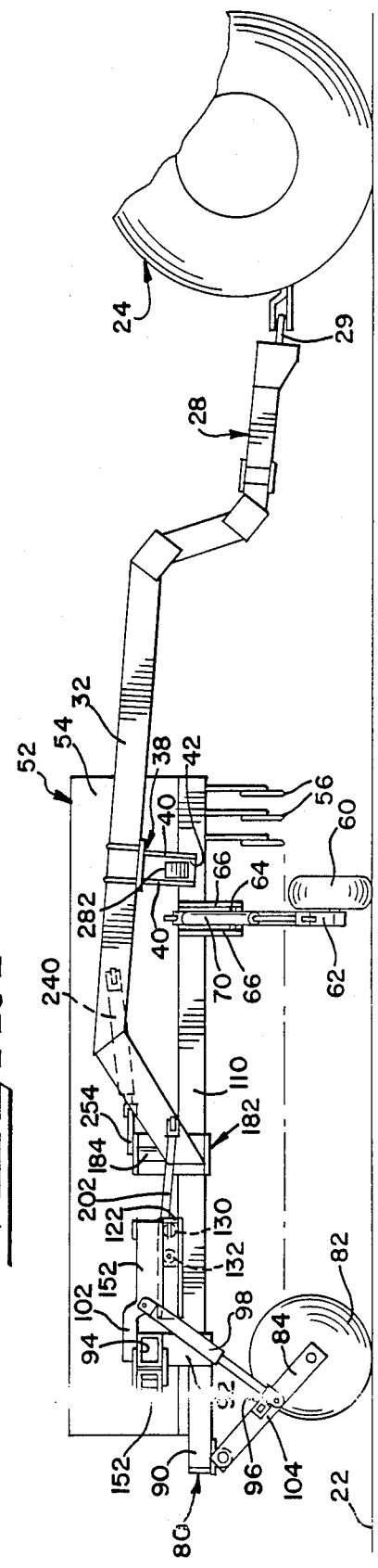

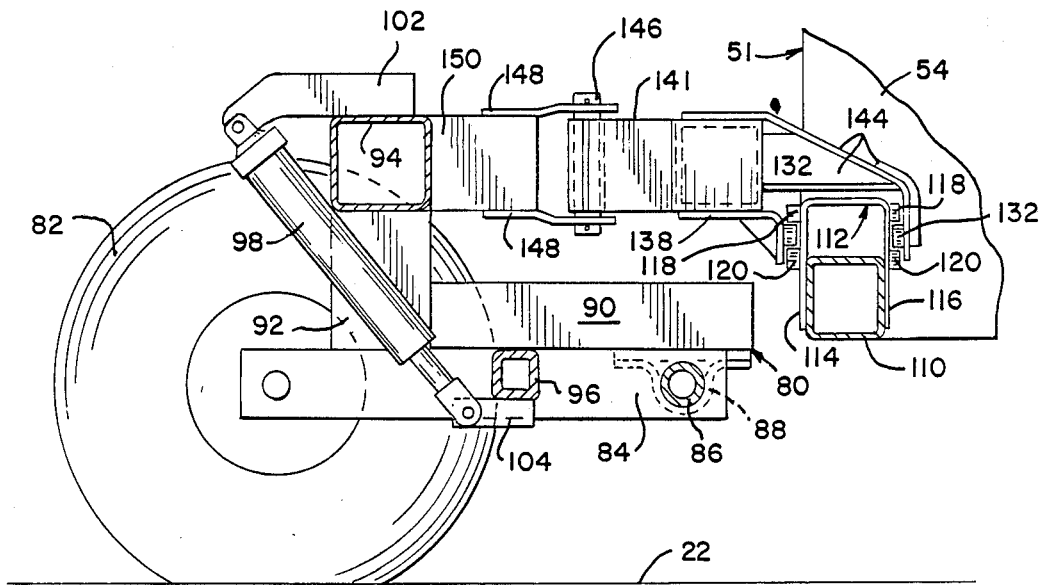
FIG-13-
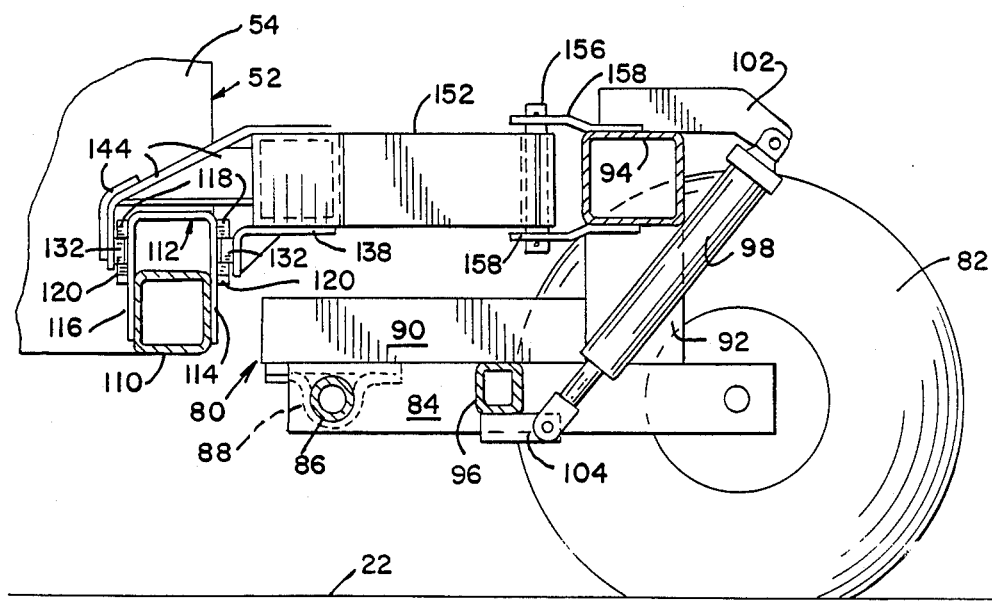
FIG-14-

FOLDABLE IMPLEMENT CARRIER

TECHNICAL FIELD

This invention generally relates to mobile machines with pivotable or foldable structures, such as agricultural implements and the like.

BACKGROUND OF THE INVENTION AND TECHNICAL PROBLEMS POSED BY THE PRIOR ART

Some conventional mobile machines, such as some agricultural implements, are provided with two or more sections that are designed to be moved between (1) a generally transverse end-to-end field configuration capable of traversing wide stretches of ground and (2) a generally parallel transport configuration wherein at least two of the sections are pivoted or folded into a generally parallel orientation so as to reduce the overall width of the machine to accommodate the transport of the machine along a highway or to accommodate storage of the machine.

When the machine sections are in the folded transport configuration, the width of the machine is substantially reduced. However, in recent years, the overall dimensions of mobile machines, and in particular, of agricultural implements, have been increasing. Thus, even when the sections of such a machine are folded in the transport configuration, the overall width can still be relatively great, and this can present problems, especially when transporting such a larger machine along roads.

There is a need to provide an improved structure for a foldable machine or implement carrier that will permit the sections to be folded in such a manner so as to further reduce the overall width of the machine in the folded, transport configuration.

Also, it would be beneficial if the improved structure could provide a relatively rigid assembly when the sections of the machine are in the folded configuration so as to accomodate safe and efficient transport in the folded configuration without undue sway, pivoting, or other movement of the folded sections.

Also, it would be desirable to provide such an improved structure with the capability for permitting each section to pivot or "float" relative to the other when the machine is being operated with the sections in the unfolded, field configuration on uneven terrain. This would accommodate vertical variation in the terrain across the width of the unfolded machine.

SUMMARY OF THE INVENTION

A foldable implement carrier is provided with a carriage having at least one ground-engaging support wheel. First and second toolbar sections are carried by the carriage. The implement carrier further includes first and second mounting means for pivotally mounting the first and second toolbar sections, respectively, to the carriage about first and second vertical pivot axes, respectively, for pivoting movement in a plane generally parallel to the ground between a generally transversely aligned end-to-end configuration and a generally parallel transport configuration. The second pivot axis is located further forward on the carriage than is the first pivot axis.

First and second motor means are provided for effecting the pivoting movement of the first and second toolbar sections, respectively. When the motor means are actuated to pivot the toolbar sections to the transport configuration, the second toolbar seotion is offset forwardly relative to the first toolbar section. Thus, the toolbar sections can be positioned closer together in the transport configuration than would otherwise would be the case because projecting portions of each of the toolbar sections become positioned in a non-interfering, staggered, generally parallel relationship.

Numerous other features and advantages of the present invention will become readily apparent from the foregoing detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a fragmentary, side elevational view of a foldable implement carrier incorporating the structure of the present invention, and the carrier is shown in a lowered, field working position on the ground and is shown coupled to the rear of a draft vehicle such as a tractor or the like;

FIG. 2 is a cross-sectional view taken generally along the plane 2—2 in FIG. 1;

FIG. 3 is a fragmentary plan view of the implement carrier with portions of the toolbar section seedboxes cut away to illustrate underlying detail;

FIG. 3A is a greatly enlarged, fragmentary plan view similar to FIG. 3;

FIG. 4 is a view similar to FIG. 1, but showing the toolbar sections of the implement carrier elevated away from the ground and showing portions of a seedbox cut away to illustrate interior detail;

FIG. 5 is cross-sectional view taken generally along the plane 5—5 in FIG. 4;

FIG. 6 is a plan view similar to FIG. 3, but showing the two toolbar sections elevated as in FIG. 4 and also pivoted about 15 degrees away from the normal end-to-end field configuration;

FIG. 7 is a view similar to FIG. 6, but showing the toolbar sections pivoted further away from the normal field configuration to the orientation where the toolbar sections are no longer free to float relative to each other;

FIG. 8 is a greatly enlarged, fragmentary, cross-sectional view taken generally along the plane 8—8 in FIG. 7;

FIG. 9 is a top plan view similar to FIG. 7, but showing the toolbar sections fully pivoted to the transport configuration;

FIG. 10 (on the sheet of drawings with FIG. 15) is a fragmentary, cross-sectional view taken generally along the planes 10—10 in FIG. 9;

FIG. 13 is a greatly enlarged, fragmentary, cross-sectional view taken generally along the plane 13—13 in FIG. 3;

FIG. 14 is a greatly enlarged, fragmentary, cross-sectional view taken generally along the plane 14—14 in FIG. 3;

FIG. 15 (on the sheet of drawings with FIG. 10) is a view similar to FIG. 5, but showing the float capability of the structure as the left-hand toolbar section pivots downwardly to follow the contour of the ground; and FIG. 16 (on the sheet of drawings with FIG. 3) is a greatly enlarged, fragmentary, perspective view of a portion of the left-hand side of the machine (as viewed in FIG. 2) showing the bracket for connecting the first (left-hand) toolbar section to the first (left-hand) draft bar.

DESCRIPTION OF THE PREFERRED EMBODIMENT

Figure 11:
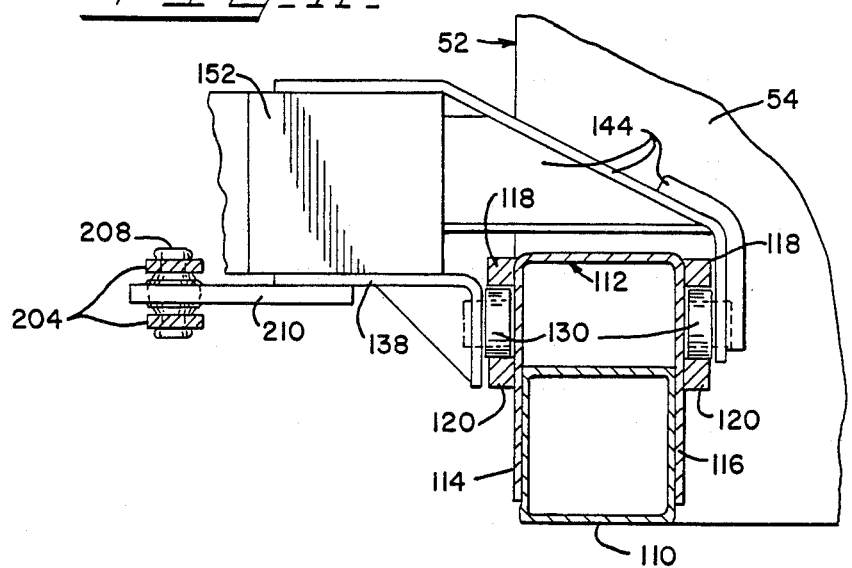
FIG. 11 is a greatly enlarged, fragmentary cross-sectional view taken generally along the plane 11—11 in FIG. 3.

Referring now to FIG. 1, a mobile machine is designated therein by reference numeral 20, and the present invention is embodied in the machine 20 in the form of one type of a foldable implement carrier, commonly known as the folding grain drill for automatically planting seeds in the ground 22 over which the machine 20 is moved.

Although the present invention is illustrated in the figures in the form of a folding grain drill machine 20, it is to be realized that the present invention may be incorporated in other mobile machines having sections or portions extending transversely (laterally) of the line of motion and wherein the sections are adapted to be folded (pivoted) to reduce the width of the machine during transport of the machines along a highway or during storage.

The machine 20 may have an integral self-propelling mechanism or may be pulled by a draft vehicle such as the tractor 24. If the machine 20 is to be pulled by a draft vehicle, such as in the embodiment illustrated, then the machine 20 is provided with a longitudinal extending draft frame which includes a draft hitch tongue 28 for being connected to, and drawn by, the draft vehicle 24 and which includes first and second draft bars 31 and 32 (FIG. 3). As best illustrated in FIGS. 1 and 3, the hitch tongue 28 includes a tongue member 29 with an aperture for receiving the hitch pin 30A of the draft vehicle drawbar clevis 30B.

Each draft bar 31 and 32 is connected at one end to the hitch tongue 28 to accommodate pivoting movement toward and away from each other. Specifically, as best illustrated in FIG. 3, the first draft bar 31 is pivotally mounted with a generally vertical pin 34, and the second draft bar is pivotally mounted with a generally vertical pin 36.

As best illustrated in FIGS. 1-3, each draft bar 31 and 32 is provided with a bracket 38 for supporting other portions of the machine 20 in the transport configuration as will be explained in detail hereafter. Each bracket 38 includes a pair of spaced-apart, downwardly depending plates 40 and a latch support bar 42 mounted at the bottom of, and between, the plates 40. For reasons that will become apparent hereinafter, the support bracket 38 on the second draft bar 32 is mounted further forwardly than is the bracket 38 on the first draft bar 31.

The rearward end of the first draft bar 31 is connected, by unique means described in detail hereinafter, to a first toolbar section 51. The second draft bar 32 is similarly connected to a second toolbar section 52. Each toolbar section 51 and 52 may include conventional components such as a seedbox 54, opener disks 56 for forming furrows in the ground 22, suitable seed tubes (not illustrated) for depositing seeds into the furrows, and press wheels 58 (FIG. 1) for pressing the soil over the seeds.

FIGS. 1-3 and 3A illustrate the toolbar sections 51 and 52 generally transversely aligned in an end-to-end field configuration. The sections 51 and 52 are adapted to be moved to a generally parallel transport configuration illustrated in FIG. 9 to accommodate transport on a highway or to accommodate storage.

The outer end of each toolbar section 51 and 52 includes an extending gauge or drive wheel 60 as best illustrated in FIGS. 1-4. As best illustrated in FIGS. 1 and 4, each gauge or drive wheel 60 is mounted for rotation at one end of an arm 62, and the arm 62 is pivotally mounted at its other end to a pin 64 carried between two spaced-apart plates 66 (FIG. 3) which are mounted to the front of the associated seedbox 54.

A suitable means is provided for effecting pivoting movement of the arm 62 relative to the associated toolbar section 51 or 52, and in the preferred embodiment illustrated, such means is provided in the form of a conventional double-acting, hydraulic cylinder-piston actuator 70 as best illustrated in FIGS. 3 and 4. The piston rod of each actuator 70 is pivotally mounted to the arm 62 and the cylinder end of the actuator 70 is pivotally mounted to the associated toolbar section 51 or 52. Actuation of the actuator 70 operates to change the elevation of the wheel 60 relative to the associated toolbar section.

Each toolbar section 51 and 52 is supported inwardly of its gauge or drive wheel 60 by a carriage 80 in a manner described in detail hereinafter. The carriage 80, as best illustrated in FIGS. 1, 2, 3A, 13, and 14, has a pair of ground-engaging wheels 82 which are each mounted for rotation to an arm 84 which is pivotally mounted to a shaft 86. As best illustrated in FIGS. 3A, 13 and 14, a bracket 88 is provided at each end of the shaft 86 for mounting the shaft 86 to the underside of two spaced-apart, longitudinal frame members 90. A vertical frame post 92 is mounted to the forward end of each longitudinal frame member 90, and a crossbeam 94 is mounted to, and between, the upper ends of the posts 92. The two carriage wheel arms 84 are also connected together by a crossbeam 96 as best illustrated in FIGS. 2, 5, 13, and 14.

As best illustrated in FIGS. 1, 2, 13, and 14, a pair of double-acting, hydraulic cylinder-piston actuators 98 are mounted between the top of the crossbeam 94 and the bottom of the cross member 96. With reference to FIGS. 13 and 14, it can be seen that the cylinder end of each actuator 98 is pivotally mounted to a plate 102 fixed to the top of the crossbeam 94, and the rod end of each actuator 98 is pivotally mounted to a plate 104 which is fixed to the bottom of the cross member 96. Operation of the actuators 98 from the retracted positions illustrated in FIGS. 1, 2, 13, and 14 to the extended positions illustrated in FIGS. 4 and 5 is effective to elevate the shaft 86 and frame members 90, 92, 94, and 96 to the raised position illustrated in FIGS. 4 and 5.

Each drive or gauge wheel 60 may function, in addition to at least partially supporting a toolbar section 51 or 52, to drive the seed dispensing or metering mechanisms (not illustrated) in the seedboxes. To this end, a drive chain mechanism (not illustrated) is provided between each gauge wheel or drive 60 and its associated seedbox seed dispensing mechanism. The drive chain, along with the associated drive mechanisms and controls, operate the seed dispensing mechanism in response to the rotation of the gauge wheel 60 as the gauge wheel 60 rolls along the ground.

Each toolbar section 51 and 52 is mounted in a unique manner to the carriage 80. With reference to FIGS. 3A and 11, it is to be noted that the seedbox 54 of the second toolbar section 52 includes a box beam 110 to which is mounted an inverted channel 112. As shown in FIG. 11, the channel 112 has a downwardly depending front leg 114 on the front side of the beam 110 and has a downwardly depending rear leg 116 on the rear side of the beam 110. Mounted to the front leg 114 are a pair of spaced-apart track members, upper track member 118 and lower track member 120, which together define a guide track.

As best illustrated in FIG. 8, an end of each of the track members 118 and 120 is angled to define a converging opening to the guide track. At the other end of the guide track, the guide track is closed by an end plate 122 which extends between the upper guide track member 118 and the lower guide track member 120.

As illustrated in FIGS. 3 and 4, an identical guide track structure, including an upper track member 118 and a lower track member 120, is provided on the rear leg 116 of the channel 112. Also, a pair of guide track structures identical to those just described for the second toolbar section 52 are provided on the first toolbar section 51 (see FIGS. 3A and 13).

As best illustrated in FIGS. 3A and 11, when the toolbar sections 51 and 52 are in the unfolded, field position, the two guide tracks defined by the track members 118 and 120 on the first and second toolbar sections each receive a first roller 130. Each of the guide tracks defined by track members 118 and 120 is also adapted to receive a second roller 132 when, as illustrated in FIG. 7, the toolbar sections 51 and 52 have been pivoted away from the unfolded, field operating position.

The rollers 130 and 132 comprise part of the mounting means for mounting the associated toolbar section 51 or 52 to the carriage 80. As best illustrated for the section 51 in FIG. 13, the rollers 130 and 132 that are associated with the guide track adjacent the channel front leg 114 are mounted to a bottom angle 138 which is secured to a first rigid link 141 having a three-piece composite structure (appearing generally in the shape of a backwards "L" as viewed in FIG. 3A). The rollers 130 and 132 adjacent the rear leg 116 of the channel 112 are mounted to an upper bracket 144 which is attached to the top and end of the first link 141.

With reference to FIG. 13, it is seen that the first link 141 is pivotally mounted about a vertically disposed pin 146 which is carried by brackets 148 which are mounted to an upper horizontal frame member 150 that is cantilevered rearwardly from the carriage crossbeam 94.

With reference to FIGS. 3A and 14, the second toolbar section 52 is mounted to the carriage 80 in a manner similar to that just described for the toolbar section 51. In particular, rollers 130 and 132 adjacent the front leg 114 of the channel 112 of the second toolbar section 52 are mounted to an angle 138 secured to the bottom of a second rigid link 152 having a three-piece composite structure (appearing generally in the shape of an "L" as viewed in FIG. 3A). The rollers 130 and 132 adjacent the rear leg 116 of the channel 112 are mounted to a bracket 144 which is attached to the top and end of the second link 152.

As best illustrated in FIG. 14, the second link 152 is pivotally mounted about a generally vertically disposed pin 156 which is carried in brackets 158 mounted directly to the carriage crossbeam 94.

It is to be noted that the first pivot link 141 pivots about a first vertical axis defined by the pin 146 and that the second pivot link 152 pivots about a second vertical axis defined by the pin 156. The second pivot axis defined by the pin 156 is located further forward on the carriage 80 than the first pivot axis defined by the pin 146. Also, with reference to FIG. 3A, it is to be noted that both the first link pivot pin 146 and the second link pivot pin 156 are offset laterally toward the first toolbar section 51, and the pins 146 and 156 are therefore not symmetrically arranged with respect to the longitudinal center line of the machine.

As best illustrated in FIGS. 2, 3A, and 16, the first toolbar section 51 is connected to the draft bar 31 between the carriage 80 and the toolbar section gauge wheel 60. In particular, a bracket 182 is mounted for rotation about a horizontally disposed pin 184 carried in the toolbar section beam 110, and the bracket 182 carries a pin 186 that is perpendicular to the pin 184. The draft bar 31 is pivotally mounted to the pin 186 in the bracket 182.

The second toolbar section 52 is connected to the second draft bar 32 in a manner identical to that described above for connecting the first draft bar 31 to the first toolbar section 51. However, as can be seen from FIG. 3, the bracket 182 for connecting the second draft bar 32 to the second toolbar section 52 is located closer to the carriage 80 than is the other bracket 182 on the first toolbar section 51.

The draft bars 31 and 32 are also each directly tied to the first and second pivot links 141 and 152, respectively. Specifically, with reference to FIG. 3A, a tie rod 202 extending from the second draft bar 32 is pivotally connected on one end to the second pivot link 152. That end of the tie rod 202 is provided with a clevis 204 which defines elongate slots 206 for receiving opposite ends of a ball joint member 208 which, as best illustrated in FIG. 11, is mounted in a lug 210 attached to the underside of the second pivot link 152. When the toolbar sections 51 and 52 are in the unfolded field orientation illustrated in FIG. 3A, the ball joint member 208 is at the right-hand end of the clevis slots 206 (as viewed in FIG. 3A).

As best illustrated in FIG. 3A, a clevis 214 is provided at the other end of the tie rod 202 and is pivotally mounted to a ball joint member 216 carried by a lug 218 on the second draft bar 32. Clevis 214, unlike the clevis 204, has bores, but not slots, in which the ends of the ball joint member 216 are received. Thus, the clevis 214 accommodates rotation about the ball joint member 216 but does not accommodate translation displacement relative to the ball joint member 216.

As best illustrated in FIG. 3A, the first draft bar 31 is connected to the first pivot link 141 by means of a tie rod 221 similar to the tie bar 202 that connects the second draft bar 32 with the second pivot link 152 as described above. However, the tie rod 221 is longer than the tie rod 202 because the first draft bar 31 is connected to the first toolbar section 51 (through bracket 182) at a distance from the carriage 80 that is greater than the distance between the carriage 80 and the point of connection of the second draft bar 32 (through the bracket 182) to the second toolbar section 52.

The tie rod 221 is connected at each end in a manner identical to that for the tie rod 202 described above. Thus, the tie rod 221 has an identical clevis 204 at one end defining slots 206 for receiving the ends of a ball joint member 208 carried by a lug 210 attached to the underside of the first pivot link 141. Similarly, the tie rod 221 has a clevis 214 at the other end which is pivotally mounted to a ball joint member 216 carried in a lug 218 on the first draft bar 31.

The machine 20 includes motor means for effecting the pivoting or folding movement of the first and second toolbar sections, and in the preferred embodiment illustrated, such means include two identical, double-acting, hydraulic cylinder-piston actuators 240 as best illustrated in FIG. 3A where one of the actuators 240 is shown disposed adjacent the first draft bar 31 and the other actuator 240 is shown disposed adjacent the second draft bar 32. The actuator 240 adjacent the first draft bar 31 is pivotally connected at one end to a lug 242 on the first draft bar 31 and is pivotally connected at the other end to a lug 244 mounted to the top of the bracket 182 on the first toolbar section 51. Similarly, the other actuator 240 is pivotally connected at one end to a lug 252 mounted to the second draft bar 32 and is pivotally connected at the other end to a lug 254 mounted to the top of the bracket 182 on the second toolbar section 52.

As illustrated in FIG. 3A, the actuators 240 are in the extended positions when the toolbar sections 51 and 52 are in the unfolded, field configuration. Operation of the actuators 240 is effective to retract the actuators 240 and move the toolbar sections 51 and 52 to the folded, transport configuration in a manner described in detail hereinafter.

It is to be noted that the novel machine structure of the present invention accommodates variations in the elevation of the ground 22 across the width of the machine. Specifically, the toolbar sections 51 and 52 are permitted to "float" relative to each other when the toolbar sections 51 and 52 are in the unfolded, field configuration. Such "float" or vertical pivoting capability is illustrated in FIG. 15 for the first toolbar section 51 which is shown pivoting about the set of rollers 130 as the toolbar section drive wheel 60 encounters a depression 23 in the ground 22.

As best illustrated in FIG. 15, the first set of rollers 130 are received between the guide track members 118 and 120 of each toolbar section 51 and 52, but the second set of rollers 132 remain beyond the ends of the guide track members 118 and 120 and are not engaged therewith. Thus, each toolbar section is free to pivot about the engaged set of rollers 130. The vertical pivoting of the first toolbar section 51 is further accommodated by the pivot connection between the first toolbar section 51 and the first draft bar bracket 182 which permits the bracket 182 to pivot about the horizontal axis of the mounting pin 184. The second toolbar section 52 is, of course, free to pivot vertically in the same manner as the first toolbar section 51 just described.

Each toolbar section 51 and 52 includes a means for supporting the end of the toolbar section during transport. To this end, the first toolbar section 51 includes a projecting latch or support member 281 (visible in FIG. 3 adjacent the left-hand end of the toolbar section 51), and the second toolbar section 52 includes a projecting support latch or member 282 (visible in FIG. 3 at the right-hand of the second toolbar section 52). The support members 281 and 282 are adapted to be received in the latch brackets 38 on the first and second draft bars 31 and 32, respectively, when the toolbar sections are in the folded configuration (FIG. 9). In order to establish proper alignment between the latch brackets 38 and the support members 281 and 282 when the toolbar sections 51 and 52 are in the folded configuration, the support member 281 is located further from the carriage 80 than is the support member 282.

Figure 12:
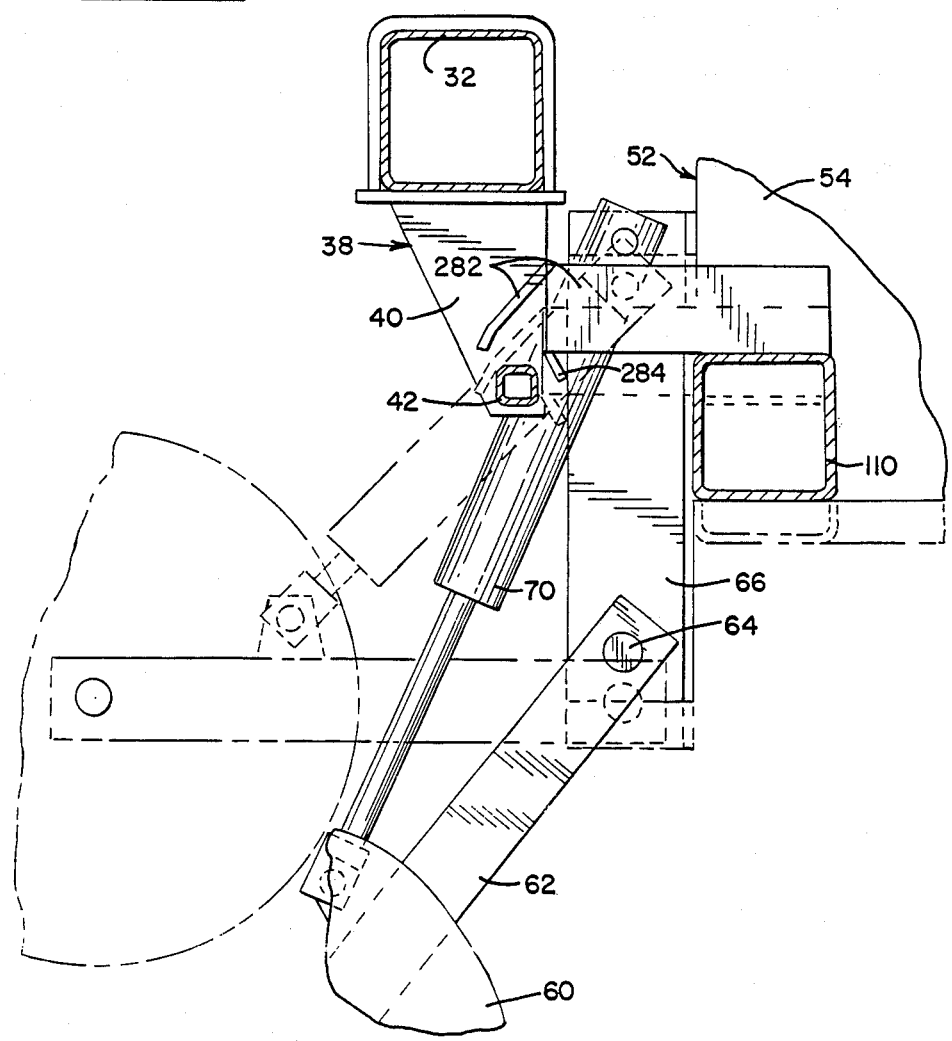
FIG. 12 is a greatly enlarged, fragmentary, cross-sectional view taken generally along the plane 12—12 in FIG. 9.

With reference to FIG. 12, it can be seen that the support member 282 is mounted to the box beam 110 along the front of the second toolbar section 52. Further, a downwardly depending flange 284 is provided at the bottom of the support member 282 to define an opening below the support member 282 for receiving the bracket latch bar 42 in a manner that will be described in more detail hereinafter. The support member 281 on the first toolbar section 51 has a structure identical to the support member 282 illustrated in FIG. 12.

The folding operation of the machine 20 will next be described. Initially, the toolbar sections 51 and 52 are in the unfolded, field configuration illustrated in FIGS. 1-3A. The toolbar sections 51 and 52 are in a lowered position relative to the ground so that the furrow opening discs 56 and the associated press wheels 58 are in contact with the ground 22.

The folding operation is initiated by raising the toolbar sections 51 and 52 so as to lift the discs 56, press wheels 58, and associated mechanisms above the ground as illustrated in FIGS. 4 and 5. To this end, the carriage wheel actuators 98 are extended and, simultaneously, the toolbar section gauge or drive wheel actuators 70 are extended. The toolbar sections 51 and 52 are raised together in a substantially uniform and level manner. When the maximum design lift height is reached (FIGS. 4 and 5), the carriage wheel actuators 98 are hydraulically locked at that position. However, the drive wheel actuators 70 are permitted to "float" to accommodate minor elevation changes in the ground when the toolbar sections 51 and 52 are subsequently pivoted toward each other.

Each wheel 60 can continue to carry that portion of the toolbar section weight that is transmitted through the actuator 70 as the wheel rolls over uneven ground. This is accomplished through the use of a conventional master-slave hydraulic system with conventional rephasing ports wherein the carriage wheel actuators 98 are the master actuators and the drive wheel actuators 70 are the slave actuators. The detailed design and specific structure of such a conventional hydraulic system incorporated in the machine 20 described herein form no part of the present invention.

As best illustrated in FIG. 4, when the toolbar sections 51 and 52 are elevated, the draft bars 31 and 32 are also angled upwardly a small amount. This is accommodated by the loose fit between the aperture in the tongue member 29 and the hitch pin 30A of the conventional drawbar clevis 30B.

The toolbar sections 51 and 52 are next folded together in the raised configuration. To this end, the double-acting actuators 240 are retracted as illustrated in FIG. 6. At the end of the first draft bar 31, the first toolbar section 51 pivots with its bracket 182 about the pin 186 while the first pivot link 141 simultaneously pivots about the pin 146. Similarly, the second toolbar section 52 pivots with its bracket 182 about the pin 186 at the end of the second draft bar 32 while the second pivot link 152 simultaneously pivots about the pin 156.

As the toolbar sections pivot, the gauge wheels 60 move forward. Also, the draft bars 31 and 32 pivot toward each other about the pins 34 and 36, respectively. Theoretically, if friction were not a factor, and if there were no exterior restraints on the machine, the carriage 80 would roll rearwardly, while the front ends of the draft bars 31 and 32 and the hitch tongue 28 would move forwardly. In practice, in order to provide a smooth folding operation, and in order to accommodate any tendency of the gauge wheels 60 to skid somewhat sideways, the tractor or other draft vehicle 24 is typically driven forward a small amount during this folding operation.

The tendency of the wheels 60 to skid sideways during the folding operation could be eliminated if each gauge wheel 60 were arranged so that its rotational axis was aligned on a radius from the associated toolbar section pivot link axis (i.e., on a radius from the axis of the pin 146 for the gauge wheel 60 on the first toolbar section 51 and on a radius from the axis of the pin 156 for the gauge wheel 60 on the second toolbar section 52). However, such an arrangement would result in the two gauge wheels 60 being offset when the toolbar sections are in the unfolded, field configuration, and this is not as desirable a configuration when operating the machine 20 in the field configuration as is the configuration wherein the drive wheels 60 rotate about a single common axis of rotation.

As illustrated in FIG. 3A, when the toolbar sections are in the unfolded, field configuration, the tie rods 202 and 221 are positioned such that the clevis slots 206 extend inwardly beyond the pins 208 toward the carriage 80. However, as best illustrated in FIG. 6, as the toolbar sections are pivoted away from the field configuration, the tie rods 202 and 221 are pulled outwardly away from the carriage 80 so that the other ends of the clevis slots 206 then engage the pins 208. In the embodiment illustrated, this occurs when each toolbar section 51 and 52 has been pivoted between about 10 and 15 degrees from the initial, transverse field configuration (to the orientation shown in FIG. 6).

As the toolbar sections 51 and 52 are pivoted away from the transverse field configuration, relative movement occurs between the first pivot link 141 and the first toolbar section 51 and also between the second pivot link 152 and the second toolbar section 52. The rollers 130 carried by the pivot links 141 and 152 move further into the guide tracks defined by the guide track members 118 and 120. When the toolbar sections 51 and 52 have been pivoted about 25° from the initial field configuration, the orientation of the machine appears as illustrated in FIG. 7. At that point, the second sets of rollers 132 have just begun to enter the guide tracks defined by the guide track members 118 and 120. Thus, from that point, vertical pivoting movement of the toolbar sections 51 and 52 is prevented owing to the spaced-apart configuration of the rollers 130 and 132 in the guide tracks.

As the folding operation continues, the tie rods 202 and 221 continue to pull the toolbar sections 51 and 52 together, and the carriage 80 becomes positioned further rearwardly so that more weight is carried by the carriage wheels 82.

Continued retraction of the folding actuators 240 brings the machine 20 into the fully folded configuration illustrated in FIG. 9 wherein the first and second toolbar sections 51 and 52, respectively, are substantially parallel. In this configuration, the rollers 130 have moved all the way along the guide tracks to the end of the tracks and have come to rest against the track end plates 122.

The toolbar section drive wheels 60 are still in contact with the ground and must next be raised away from the ground (to the elevated position indicated in dashed lines in FIG. 9) to allow the machine 20 to be pulled forwardly during transport. This is accomplished, as best illustrated in FIG. 12 for the second toolbar section 52, by retracting the actuator 70 to raise the wheel 60 (to the elevated position shown in dashed lines in FIG. 12).

With reference again to FIG. 9, it is to be noted that when the toolbar sections 51 and 52 are in the fully folded configuration, the projecting latch support members 281 and 282 are aligned with the brackets 38 on the associated draft bars 31 and 32, respectively. As best illustrated in FIG. 12 for the second toolbar section 52, the projecting support member 282 initially enters the bracket latch 38 above the bracket bar 42 between the side plates 40. Subsequently, as the drive wheel 60 is raised off of the ground, the projecting support member 282 engages the bracket bar 42. Thus, the toolbar section weight previously carried by the drive wheel 60 is transferred to the draft bar 32. The first toolbar section 51 is similarly supported on the first draft bar 31 as the drive wheel 60 of the first toolbar section 51 is simultaneously raised off of the ground.

With reference to the folded configuration shown in FIG. 9, it can be seen that the drive wheels 60 of the toolbar sections 51 and 52 are in a non-interfering, staggered, generally parallel relationship. The wheel 60 of the second toolbar section 52 is located forwardly of the wheel 60 of the first toolbar section 51 because the second link pivot pin 156 is located forwardly of the first link pivot pin 146. With this arrangement, the wheels 60 can be symmetrically arranged about the longitudinal center line of the machine in the field configuration so as to accommodate proper movement of the machine 20 during field operation. However, in the folded configuration, the offset relationship of the wheels 60 (and of any other projecting components) permits the toolbar sections 51 and 52 to be moved closer together than would otherwise be possible.

The drive wheel actuators 70, the carriage wheel actuators 98, and the toolbar section folding actuators 240 have been illustrated and described as being double-acting, hydraulic cylinder-piston actuators. It is to be realized that, with some types of mobile machines, and with appropriate design modifications, other suitable motors or actuating means may be provided, such as electric motor drive systems.

It will be readily observed from the foregoing detailed description of the invention and from the illustrated embodiment thereof that numerous variations and modifications may be effected without departing from the true spirit and scope of the novel concepts or principles of this invention.

What is claimed is:

1. A foldable implement carrier comprising:

a carriage having at least one ground-engaging support wheel and first and second toolbar sections carried by said carriage;

first and second mounting means movable relative to said first and second toolbar sections, respectively, for pivotally mounting said first and second tool bar sections, respectively, to said carriage about first and second vertical pivot axes, respectively, for pivoting movement in a plane generally parallel to the ground between a generally transversely aligned end-to-end field configuration and a generally parallel transport configuration, said second pivot axis being located further forward on said carriage than said first pivot axis;

a draft frame including first and second draft bars each connected at a front end of said frame for pivoting movement, each said first and seconddraft bar being pivotally connected rearwardly of said frame front end to said first and second toolbar sections, respectively;

first and second motor means each operatively connected, respectively, between said first toolbar section and said first draft bar and between said second toolbar section and said second draft bar for effecting said pivoting movement of said first and second toolbar sections, respectively;

first and second tie rods each pivotally connected at opposite ends, respectively, between said first mounting means and said first draft bar and between said second mounting means and said second draft bar whereby, when said motor means are actuated to pivot said toolbar sections to said transport configuration, said second toolbar section is offset forwardly relative to said first toolbar section so that projecting portions of said toolbar section are in a staggered, generally parallel relationship, in which each said toolbar section includes a guide track;

in which each said first and second mounting means includes a link mounted to said carriage for pivoting about one of said first and second pivot axes; and in which each said first and second mounting means further includes connecting means for connecting one of said toolbar sections with one of said links, said connecting means including at least a first roller connected to one of said links and engaged with one of said toolbar section guide tracks.

2. The carrier in accordance with claim 1 in which said carriage has two spaced-apart, ground-engaging, support wheels.

3. The carrier in accordance with claim 1 in which each said toolbar section includes an extending gauge wheel projecting beyond the other portions of the associated toolbar section for partly supporting the asscoiated toolbar section on the ground.

4. The carrier in accordance with claim 1 in which each said tie rod is connected at each end with a ball joint.

5. The carrier in accordance with claim 1 further including at least another roller connected to said one link and spaced from said first roller along said one link so as to be disengaged from said one of said toolbar section guide tracks when the toolbar sections are transversly aligned end-to-end in the field configuration and so as to engage said one of said toolbar section guide tracks when said toolbar sections are in the generally parallel transport configuration.

6. The carrier in accordance with claim 1 in which each said first and second motor means comprises a double-acting, extendable and retractable, hydraulic cylinder-piston actuator.

7. The carrier in accordance with claim 1 in which said carriage includes actuating means for effecting relative movement between said carriage and said ground-engaging wheel whereby the elevation of said carriage above the ground can be changed.

8. A foldable implement carrier comprising:

a carriage having at least one ground-engaging support wheel;

first and second toolbar sections carried by said carriage;

first and second mounting means for pivotally mounting said first and second toolbar sections, respectively, to said carraige about first and second vertical pivot axes, respectively, for pivoting movement in a plane generally parallel to the ground between a generally transversely aligned end-to-end field configuration and a generally parallel transport configuration, said second pivot axis being located further forward on said carriage than said first pivot axis; and first and second motor means for effecting said pivoting movement of said first and second toolbar sections, respectively, whereby, when said motor means are actuated to pivot said toolbar sections to said transport configuration, said second toolbar section is offset forwardly relative to said first toolbar section, in which said carrier further comprises a longitudinally extending draft frame including support bracket means, each said toolbar section including support member means, each said toolbar section further including an extending gauge wheel pivotally mounted to a portion of said toolbar section, each said toolbar section including actuating means for raising and lowering said gauge wheel whereby, when said toolbar sections are aligned in the generally parallel transport configuration, each said toolbar section gauge wheel may be raised so taht each said toolbar section support member is lowered into engagement with said draft frame support bracket means.

9. The carrier in accordance with claim 8 in which said longitudinally extending draft frame includes a draft hitch tongue for being connected to and drawn by a draft vehicle and further includes first and second draft bars each connected at one end to said hitch tongue for pivoting movement toward and away from each other;

said carriage is spaced rearwardly of said hitched tongue;

said first and second draft bars are pivotally connected rearwardly of said hitch tongue to said first and second toolbar sections, respectively; and said first and second motor means are operatively connected, respectively, between said frist toolbar section and said first draft bar and between said second toolbar section and said second draft bar.

10. The carrier in accordance with claim 9 in which said first first mounting means includes a first link mounted to said carriage for pivoting about said first vertical pivot axis;

said second mounting means includes a second link mounted to said carriage for pivoting about said second vertical pivot axis;

said first mounting means further includes first connecting means for connecting said first toolbar section with said first link so as to accommodate relative movement between said first toolbar section and said first link at a fixed distance from said first pivot axis along a plane generally parallel to the ground; and said second mounting means further includes second connecting means for connecting said second toolbar section with said second link so as to accommodate relative movement between said second toolbar section and said second link at a fixed distance from said second pivot axis along a plane generally parallel to the ground.

11. The carrier in accordance with claim 10 in which each said toolbar section includes an extending gauge wheel for partly supporting the associated toolbar section on the ground;

a first tie rod is pivotally connected at each end between said first link and said first draft bar; and a second tie rod is pivotally connected at each end between said second link and said second draft bar whereby, when said motor means are actuated to pivot said toolbar sections to said transport configuration, said second toolbar section is offset forwardly relative to said first toolbar section so that said gauge wheels of each said toolbar sections are in a staggered, generally parallel relationship.

12. A foldable implement carrier comprising:

a carriage having at least one ground-engaging support wheel and first and second toolbar sections carried by said carriage;

first and second mounting means movable relative to said first and second toolbar sections, respectively, for pivotally mounting said first and second tool bar sections, respectively, to said carriage about first and second vertical pivot axes, respectively, for pivoting movmeent in a plane generally parallel to the ground between a generally transversely aligned end-to-end field configuration and a generally parallel transport configuration, said second pivot axis being located further forward on said carriage than said first pivot axis;

a draft frame including first and second draft bars each connected at a front end of said frame for pivoting movement, each said first and second draft bar being pivotally connected rearwardly of said frame front end to said first and second toolbar sections, respectively;

first and second motor means each operatively connected, respectively, between said first toolbar section and said first draft bar and between said second toolbar section and said second draft bar for effecting said pivoting movement of said first and second toolbar sections, respectively;

first and second tie rods each pivotally connected at opposite ends, respectively, between said first mounting means and said first draft bar and between said second mounting means and said second draft bar whereby, when said motor means are actuated to pivot said toolbar sections to said transport configuration, said second toolbar section is offset forwardly relative to said first toolbar section so that projecting portions of said toolbar section are in a staggered, generally parallel relationship, in which each said first and second draft bar includes a support bracket, in which each said toolbar section includes a projecting support member, in which each said toolbar section includes an extending gauge wheel pivotally mounted to a portion of said toolbar section, in which each said toolbar section includes actuating means for raising and lowering said gauge wheel whereby, when said toolbar sections are aligned in the generally parallel transport configuration, each said toolbar section gauge wheel may be raised so that each said toolbar section support member is lowered into engagement with one of said draft bar support brackets.

13. A foldable implement carrier comprising:

a carriage having at least one ground-engaging support wheel;

first and second toolbar sections carried by said carriage;

first and second mounting means for pivotally mounting said first and second toolbar sections, respectively, to said carriage about first and second vertical pivot axes, respectively, for pivoting movement in a plane generally parallel to the ground between a generally transversely aligned end-to-end field configuration and a generally parallel transport configuration, said second pivot axis being located further forward on said carriage than said first pivot axis; and first and second motor means for effecting said pivoting movement of said first and second toolbar sections, respectively, whereby, when said motor means are actuated to pivot said toolbar sections to said transport configuration, said second toolbar section is offset forwardly relative to said first toolbar section, said carrier further comprising a longitudinally extending draft frame that includes a draft hitch tongue for being connected to and drawn by a draft vehicle and that further includes first and second draft bars each connected at one end to said hitch tongue for pivoting movement toward and away from each other; said carriage being spaced rearwardly of said hitch tongue; said first and second draft bars being pivotally connected rearwardly of said hitch tongue to said first and second toolbar sections, respectively; said first and second motor means being operatively connected, respectively, between said first toolbar section and said first draft bar and between said second toolbar section and said second draft bar, said first mounting means including a first link mounted to said carriage for pivoting about said first vertical pivot axis; said second mounting means including a second link mounted to said carriage for pivoting about said second vertical pivot axis; said first mounting means further including first connecting means for connecting said first toolbar section with said first link so as to accommodate relative movement between said frist toolbar section and said first link at a fixed distance from said first pivot axis along a plane generally parallel to the ground; said second mounting means further including second connecting means for connecting said second toolbar section with said second link so as to accommodate relative movement between said second toolbar section and said second link at a fixed distance from said second pivot axis along a plane generally parallel to the ground, each said toolbar section including a guide track; and each said connecting means including a roller mounted to one of said links for engaging said guide track on one of said toolbar sections.

* * * * *